US008370922B1

United States Patent
Doukhvalov et al.

(10) Patent No.: US 8,370,922 B1
(45) Date of Patent: Feb. 5, 2013

(54) PORTABLE SECURITY DEVICE AND METHODS FOR DYNAMICALLY CONFIGURING NETWORK SECURITY SETTINGS

(75) Inventors: Andrey P. Doukhvalov, Moscow (RU); Pavel V. Dyakin, Moscow (RU); Sergey Y. Golovanov, Moscow (RU); Igor I. Soumenkov, Moscow (RU); Dmitry A. Kulagin, Moscow (RU); Alexey Y. Voitovich, Moscow (RU); Eugene V. Kaspersky, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/475,781

(22) Filed: May 18, 2012

Related U.S. Application Data

(60) Provisional application No. 61/541,237, filed on Sep. 30, 2011.

(51) Int. Cl.
G06F 21/20 (2006.01)
H04L 29/02 (2006.01)
(52) U.S. Cl. .............. 726/15; 726/11; 726/23
(58) Field of Classification Search .......... 713/168; 726/5, 7, 9, 22
See application file for complete search history.

(56) References Cited

U.S. PATENT DOCUMENTS

| 6,490,626 | B1 | 12/2002 | Edwards et al. | |
|---|---|---|---|---|
| 6,704,024 | B2 | 3/2004 | Robotham et al. | |
| 7,114,078 | B2 | 9/2006 | Carman | |
| 7,386,885 | B1 | 6/2008 | Kaspersky et al. | |
| 7,428,992 | B2 | 9/2008 | Tanabiki et al. | |
| 7,478,427 | B2 | 1/2009 | Mukherjee et al. | |
| 7,584,508 | B1 * | 9/2009 | Kashchenko et al. | 726/25 |
| 7,716,475 | B2 * | 5/2010 | Asai et al. | 713/166 |
| 7,730,535 | B1 | 6/2010 | Kaspersky et al. | |
| 7,748,041 | B2 * | 6/2010 | Anzai et al. | 726/25 |
| 7,882,247 | B2 | 2/2011 | Sturniolo et al. | |
| 7,940,732 | B2 | 5/2011 | Lowry et al. | |
| 8,024,790 | B2 | 9/2011 | Zhao et al. | |
| 2003/0174167 | A1 | 9/2003 | Poo et al. | |
| 2004/0120260 | A1 | 6/2004 | Bernier et al. | |

(Continued)

FOREIGN PATENT DOCUMENTS

| GB | 2420198 A | 5/2006 |
|---|---|---|
| GB | 2444650 A | 11/2008 |

(Continued)

OTHER PUBLICATIONS

C. Xenakis et al., "Dynamic Network-Based Secure VPN Deployment in GPRS", Personal, Indoor and Mobile Radio Communications, 13th IEEE International Symposium Sep. 15-18, 2002, pp. 1260-1265.

*Primary Examiner* — Venkat Perungavoor
(74) *Attorney, Agent, or Firm* — Arent Fox LLP; Michael Fainberg

(57) ABSTRACT

Disclosed herein are systems, methods and computer program products for providing secure Internet access to a user device in an unsecure network environment, such as a public wireless network. The system includes a portable security device configured to establishing a first secure direct wireless connection with the user device and a second secure network connection through the public wireless network to a security server, which provides Internet access. The security device provides Internet browser and e-mail application, which can be used instead of unsecure applications of the user device to access Web resources through the first and second secure network connections. In addition, the security device includes a secure keyboard, which can be used by the device user instead of the unsecure keyboard of the user device to enter user authentication data for accessing the desired Web resources.

24 Claims, 7 Drawing Sheets

U.S. PATENT DOCUMENTS

| | | |
|---|---|---|
| 2004/0143730 A1 | 7/2004 | Wen et al. |
| 2005/0022014 A1* | 1/2005 | Shipman ............... 713/201 |
| 2006/0056366 A1 | 3/2006 | Dupler et al. |
| 2007/0038677 A1* | 2/2007 | Reasor et al. ............ 707/200 |
| 2007/0088948 A1* | 4/2007 | Ji et al. ............... 713/166 |
| 2007/0192798 A1 | 8/2007 | Morgan |
| 2008/0034210 A1 | 2/2008 | Jallad et al. |
| 2008/0072316 A1* | 3/2008 | Chang et al. ............ 726/21 |
| 2008/0120717 A1* | 5/2008 | Shakkarwar ............ 726/18 |
| 2008/0244689 A1 | 10/2008 | Dalton |
| 2008/0256536 A1 | 10/2008 | Zhao et al. |
| 2008/0300998 A1 | 12/2008 | Harkabi et al. |
| 2008/0301003 A1 | 12/2008 | Harkabi et al. |
| 2009/0007227 A1* | 1/2009 | Burgess et al. ............ 726/1 |
| 2009/0094671 A1* | 4/2009 | Kurapati et al. ............ 726/1 |
| 2009/0106427 A1 | 4/2009 | Plumb |
| 2009/0131020 A1 | 5/2009 | van de Groenendaal |
| 2009/0319432 A1 | 12/2009 | Renfro |
| 2011/0051698 A1 | 3/2011 | Verma |
| 2011/0078590 A1* | 3/2011 | Hao et al. ............... 715/755 |
| 2011/0119484 A1 | 5/2011 | Jallad et al. |
| 2011/0208963 A1 | 8/2011 | Soffer |

FOREIGN PATENT DOCUMENTS

| | | |
|---|---|---|
| GB | 2474036 A | 4/2011 |
| WO | 0106787 A1 | 1/2001 |
| WO | 02078290 A1 | 10/2002 |
| WO | 2009127904 A1 | 10/2009 |

* cited by examiner

PORTABLE SECURITY DEVICE AND METHODS FOR DYNAMICALLY CONFIGURING NETWORK SECURITY SETTINGS

CROSS-REFERENCE TO RELATED APPLICATIONS

This application claims benefit of priority under 35 U.S.C. 119(e) to Provisional Application No. 61/541,237 filed on Sep. 30, 2011, which is incorporated by reference herein.

TECHNICAL FIELD

The present disclosure generally relates to the field of network security, and specifically to systems, methods and computer program products for providing secure Internet access to a user device operating in an unsecure network environment.

BACKGROUND

Despite significant advances in the field of computer and network security, the number of security threats is constantly growing. New types of malware, such as viruses, Trojans and worms, are being developed by cybercriminals to steal personal and confidential information from computers, mobile phones and other electronic devices that use wired, wireless or cellular networks to access the Internet. Some of the common security threats include browser hijacking, keystroke logging (keylogging) and network sniffing. Browser hijacking malware may access browser's files and steal user's personal authentication information, such as login names and passwords, for various websites, stored therein. Keyloggers intercept user's keyboard input to obtaining data typed by the user, such as authentication information and other private data. Network sniffers (also known as packet analyzers) intercept and analyze data traffic on public (or open) networks and, therefore, also can access personal or confidential data transmitted over the network.

Known computer and network security solutions, such as firewalls, antivirus applications, proactive defense mechanisms, cloud detection techniques and others, have limitations and often do not provide sufficient security to user devices operating in an unsecure network environment, such as public networks, where the user devices and data transmitted to and from these devices over such unsecure networks are exposed to eavesdropping and other forms of data theft. Therefore, there is a need for a reliable network security system for use in unsecure network environments.

SUMMARY

Disclosed herein are systems, methods and computer program products for providing secure Internet access in an unsecure network environment. In one example embodiment, the system includes a portable security device that provides secure Internet access to a user device, such as a notebook or tablet computer, operating in an unsecure (e.g., public) wireless network. In one example embodiment, the security device includes a wireless network module for establishing a first secure direct wireless connection with the user device. The security device may also include another network module for establishing a second secure network connection through the wireless network to a security server, which provides Internet access to the user device. In one example embodiment, the security device provides different Internet-accessing applications, such as an Internet browser and e-mail application, which can be used instead of the unsecure applications of the user device to access Web resources for the user device through the first and second secure network connections. In another example embodiment, the security device includes a secure data input user interface, such as a keyboard, which can be used by the device user instead of the unsecure data input interface of the user device to enter user authentication data for accessing desired Web resources.

In one example embodiment, the security device is configured to provide network security in an unsecure network environment. In particular, the security device establishes a first secure wireless network connection with a user device. The first secure wireless network may be a private wireless network. Using the first secure wireless connection, the security device activates a security agent on the user device. The security agent is configured to identify and retrieve from the user device second network configuration settings used by the user device to connect to the Internet. The second network configuration settings may be the last configuration settings used by the user device to connect to the Internet. The second network may be an unsecure, public wireless, wired or cellular network. Using the received network configuration settings, the security device establishes a second secure network connection to a security server, which provides access to the Internet. The security server may be a Virtual Private Network (VPN) server. Then, the security device receives through the first network connection a data transmission from the user device directed to a destination on the Internet. The security device forwards the received data through the second network connection to the security server. The security server in turn forwards the received data to the destination. In this manner, the security server functions as an Internet gateway for the user device.

In another example embodiment, the security device is configured to provide secure Internet access to a user device in an unsecure network environment. After activation, the security device establishes a first secure network connection with a user device. The security device activates a security agent on the user device. The agent is configured to access video module of the user device for displaying the video signal from the security device. Then, the security device establishes a second secure network connection with a security server, which provides access to the Internet. Then, an Internet browser, e-mail application or other communication application is activated on the security device for accessing through the second network connection and the security server a Web resource on the Internet. The security device transmits over the second network connection user authentication data to the security server for accessing the Web resource. The authentication data may be entered by the user through the device's keyboard. Alternatively, the authentication data may have been stored and retrieved from the memory of the secure device. Finally, the security device transmits over the first network connection a browser-related data, a Web resource-related data, and user authentication data, as a video signal, for display on the user device.

In another example embodiment, the security device is configured to manage user authorization information for accessing various Web resources. The security device stores a plurality of operating system agents that facilitate communication with a plurality of user devices each having a different operating system. The security device also stores different sets of user authentication data for accessing a plurality of Web resources by a user device. Next, the security device connects with a user device through a secure wireless network and activates an appropriate operating system agent corresponding to operating system of the connected user device for communicating with the user device. In addition, the security device connects to a VPN server, which provides Internet access to the user device. The security device selects an appropriate set of user authentication data associated with a Web resource requested by the user device and transmits the selected set of user authentication data and a Web resource request to the VPN server, which obtains the requested Web resource from a remote Web server using user authentication data.

In another example embodiment, the security device is configured to dynamically change network security setting for a user device. In particular, the security device collects system hardware and software information from the user device using a security agent deployed on the user device. The security device then assesses security characteristics of the user device based on the collected hardware and software information. The security device also obtains network configuration setting of a local wireless network and assesses security characteristics of the wireless network based on the network configuration settings. Then, the security device selects network access security setting for the user device based on the security characteristics of the user device and the security characteristics of the wireless network. If, at some later time, the security device detects changes in the security characteristics of the user device or the security characteristics of the wireless network, the security device dynamically changes the security settings of the user device based on the changes in the security characteristics of the user device or the security characteristics of the wireless network.

The above simplified summary of example embodiments serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for providing secure communications in an unsecure network environment. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
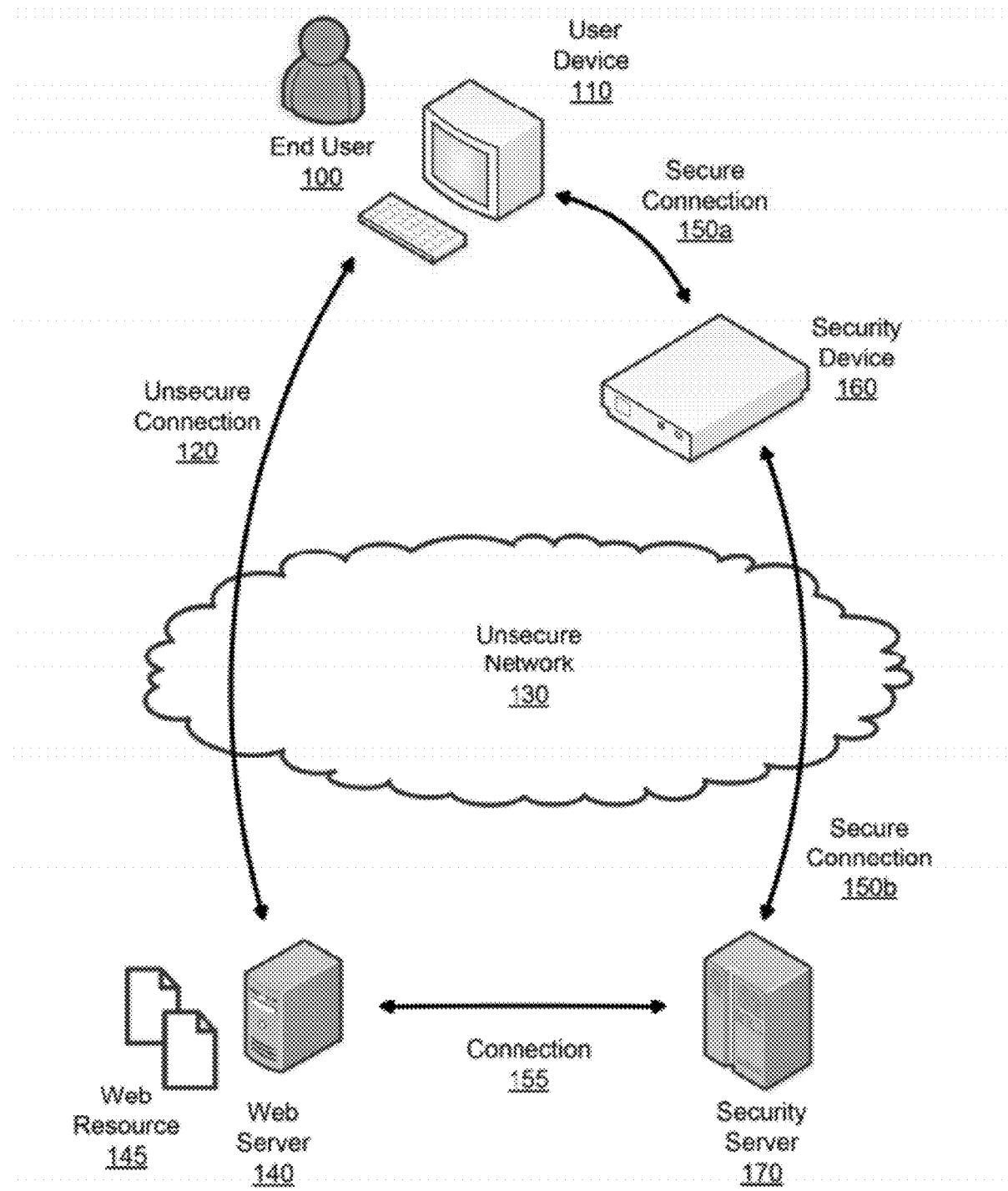
FIG. 1 illustrates a network deployment diagram of a system for secure network communication according to one example embodiment.

FIG. 1 illustrates one example of an unsecure network environment in which the present invention can be utilized. Generally, an unsecure network environment may include a public wireless local area network (WLAN) 130, which uses Wi-Fi technology, and is commonly available in coffee shops, airports and other public places. Alternatively, the unsecure network environment may include a wired LAN, such as Ethernet, wireless personal area network, such as Bluetooth, or a cellular network, such as GSM, CDMA, LTE, or other types of private or public network(s). In one example embodiment, the network 130 provides free or paid Internet access to user devices 110, such as personal computers, notebook computers, tablet computer, mobile phones or other communication devices. Through the network 130, the user devices 110 may access Web resources 145, including but not limited to Websites, e-mails, audio, video and data files, which reside on remote Web server(s) 140, such as application server, e-mail server, database server or other type of data storage devices connected to the Internet.

To access Web resources 145, a user device 110 establishes Internet protocol connection(s) 120, such as a TCP/IP, UDP or the like, through the network 130, and other intermediate networks, with the Web server 140. However, since the network 130 is unsecure, the connection(s) 120 established through the network 130 are generally also unsecure and, therefore, subject to eavesdropping or other security attacks by cybercriminals. In addition, the user device 110 may be also unsafe, e.g., infected with a browser hijacking program, keylogger or other malware that may further jeopardize security of private information, such as login names and passwords, which is stored or entered by the end user 100 on the user device 110 and transmitted thought the network 130. There are many other possible threats to the security of the user device 110 and network 130.

To ensure security of private information stored or entered on the user device 110 as well as security of communications to and from user device 110 over an unsecure network 130, the end user 100 may use a portable security device 160 of the present invention. Instead of using unsecure connection(s) 120 through the network 130, the security device 160 is designed to establish a first direct secure wireless connection 150a with the user device 110. The connection 150a may use a WAP, WAP2, WEP2, TKIP or other secure wireless network protocol. The security device 160 also establishes a second secure connection 150b with a remote security server 170.

The server 170 may include, but is not limited to a Virtual Private Network (VPN) server, such as a Kaspersky® VPN. The second secure connection 150b may include a VPN tunnel through the unsecure network 130 and other intervening networks. In other embodiments, the secure connection 150b may use HTTP Secure (HTTPS) or other types of secure standard or proprietary network protocols.

In one example embodiment, the security server 170 functions as an Internet access gateway, which provides Internet access to the user device 110 through the first and second secure connections 150a and 150b. For example, the user device 110 may send a Web resource request to the security device 160 through first secure connection 150a. The security device 160 forwards the request through the second secure connection 150b to the security server 170. The security server 170 identifies and contacts the Web server 140 to retrieve the requested Web resource 145 and returns the Web resource 145 to the user device 110 through the second and first secure connections 150b and 150a. In addition to providing Internet access, in one example embodiment, the security server 170 may also scan the data traffic to and from the user device 110 for presence of viruses or other malware. Therefore, using connections 150a and 150b, the security device 160 provides secure Internet access to the user device 110 in the unsecure network environment 130.

Figure 2:
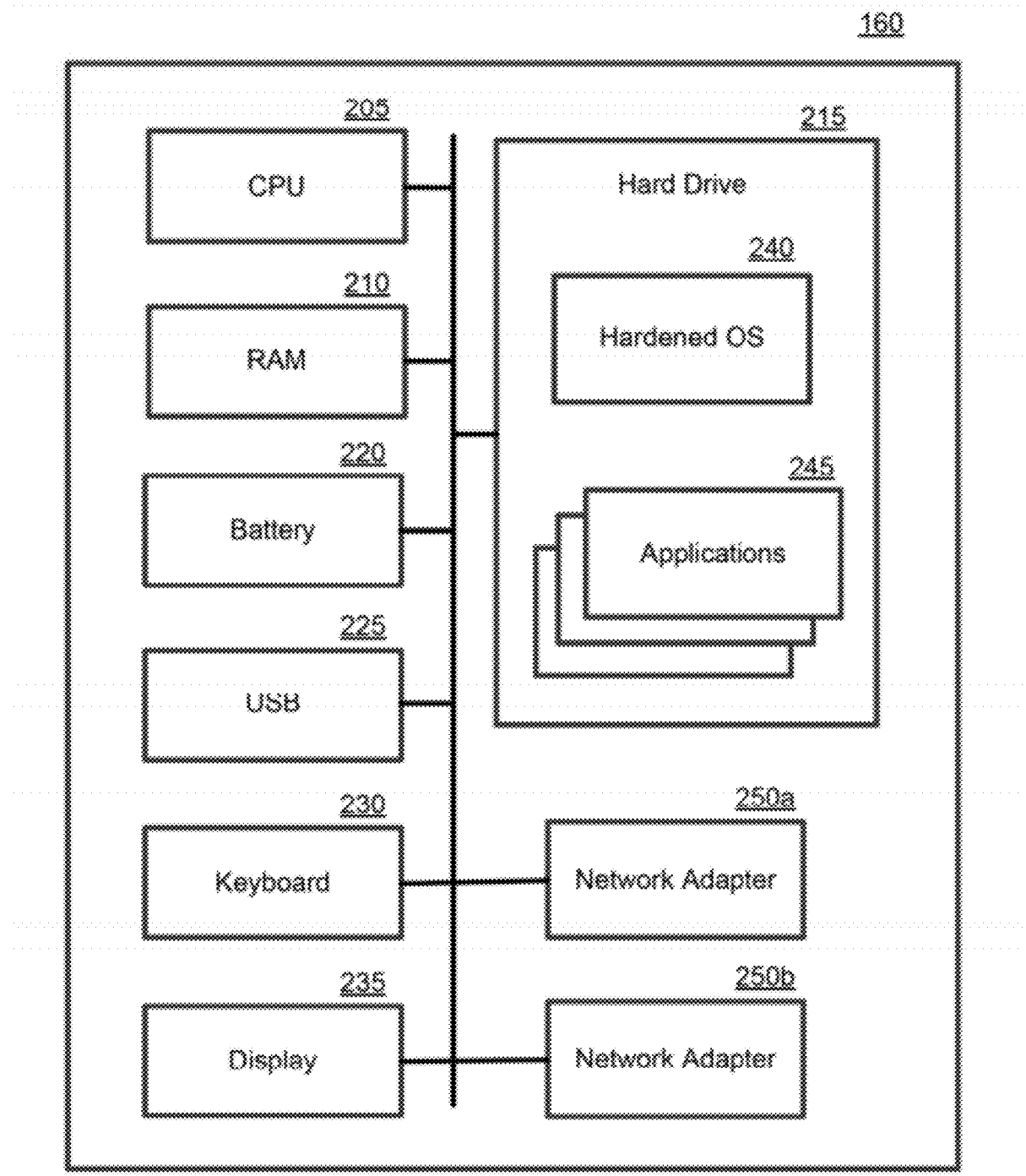
FIG. 2 illustrates a block diagram of a security device according to one example embodiment.

FIG. 2 depicts a block diagram of an example embodiment of the security device of the present invention. The security device 160 may be a portable electronic device that includes a CPU 205, such as Intel® Core 2 processor or the like, a random access memory (RAM) 210, a hard drive 215, a rechargeable battery 220, one or more communication ports 225, such as USB ports, Firewire, eSATA, used for communicating and/or charging of device 160, a keyboard 230 or other data entry device, and an optional display 235, such as an LCD display. In one example embodiment, the security device 160 may have a hardened operating system 240, such as hardened Linux® OS, Unix® OS, Android® OS or other proprietary OS with enhanced security features, such as security policies, mandatory access control policies, intrusion detection system and other standard features provided by the security-focused operating systems. Although the use of hardened OS 240 is not required in different embodiments of the invention, the use of hardened OS 240 provides enhanced security to the device 160 against intrusion attacks.

In one example embodiment, the security device 160 may also include one or more wireless network modules 250a and 250b, such as Wi-Fi® network interface card, cellular network cards, such as GSM, CDMA or LTE, a Bluetooth card, Ethernet card or other types of wired or wireless network adapters. For example, network module 250a, such as a Wi-Fi® network adapter, may be used by the device 160 to establish a first secure connection 150a with a corresponding wireless network adapter of the user device 110. In one example embodiment, the security device 160 and user device 110 may establish a direct (also known as ad-hoc) Wi-Fi connection with each other using, e.g., Wi-Fi Direct standard. In another embodiment, the security device 160 may be configured to operate as a Wi-Fi access point to which user device 110 connects using standard IEEE 802.11 mechanisms.

In one example embodiment, the security device 160 may include a plurality of different operating system agents (not shown) that facilitate communication with a plurality of user devices 110 each with a different operating system, e.g., Windows OS, Unix OS, Mac OS, Android OS, Symbian OS, and other types of operating systems. During establishment of a first secure connection 150a with a new user device 110, the security device 160 may determine the operating system that runs on the user device 110 and activate the corresponding OS agent for communication with the OS of the user device 110. The OS agent may perform the following functions: authentication of the user device 110 and security device 160, establishment of connection 150a and transmission of video signals through this connection, collection of network security information, and assessment of security risks of user device 110 and network 130.

In another example embodiment, instead of or in addition to using OS agents on the security device 160, the end user 100 may install on the user device 110 a security agent (not shown) of the security device 160. The security agent facilitates establishment of the secure connection 150a as well as transmission of data to and from the security device 160. In one example embodiment, the security agent may implement a constraint-based and attribute-based security system for controlling interaction of software components of the user device 110, as disclosed, for example, in the commonly owned U.S. Pat. Nos. 7,386,885 and 7,730,535, which are incorporated by reference herein in their entirety.

In one example embodiment, the security device 160 may use another network module 250b to establish the second secure connection 150b with the security server 170 through the network 130. In another embodiment, the security device 160 may use the same network module 250a to establish the second secure connection 150b. In either case, according to one example embodiment, the security device 160 may be configured to search for radio signals from the available wireless network 130 in order to connect to network 130. In another example embodiment, the security device 160 may be configured to obtain from the user device 110 the last known network configuration settings used by the device 110 to connect to the Internet, which is likely to be the configuration of unsecure connection 120. In particular, the security device 160 may send through the first secure connection 150a to the security agent deployed on the user device 110 a request to obtain the network configuration settings from the user device 110 and send it to the security device 160. Using the network configuration settings, the security device 160 may connect to the network 130 and establish second secure connection 150b with the security server 170. As indicated above, the second secure connection 150b may be a VPN tunnel.

Having established secure connections 150a and 150b, the end user 100 may use an Internet browser application or e-mail application (not shown) of the user device 110 to access Web resources 145, such as Web pages or e-mail accounts, through the security device 160 and security server 170, which functions as an Internet access gateway for the user device 110. In this manner, the security device 160 protects communications to and from the user device 110 over the public network 130 from eavesdropping and other network security attacks. However, the user device 110 and its internal applications may be already infected by malware, such as a browser hijacker or keylogger, and therefore, personal user data, such as user names, passwords and other private information, typed by the end user 100 into the user device 110 or stored in the memory of the user device 110 is subject to theft.

To prevent theft of the personal information, the security device 160 may include its own secure software applications 245, such an Internet browser application, e.g., Firefox® or Google® Chrome®, an e-mail application, such as Microsoft® Outlook®, and an antivirus application, such as Kaspersky® Internet Security or Kaspersky® Antivirus, which may be used instead of unsafe browser and e-mail applications of the user device 110 to access Web resources 145 according to one example embodiment. The application (s) 245 may be automatically activated when secure connections 150a and 150b are established. Alternatively, the desired application 245 may be activated by the end user 100 through an application selection menu displayed on the internal display 235 using keyboard 230.

In one example embodiment, a graphical user interface (GUI) of the activated application 245 may be displayed on the internal display 235 of the security device 160. However, in a preferred embodiment, the GUI of the activated application 245 may transmitted in a video format, e.g., as a streaming video file, to the security agent of the user device 110 for display on the internal monitor of the user device 110, which has generally larger size of the viewing area than the display 235 of the security device 160. In this manner, the application 245 is running on the security device 160, but is displayed on the user device 110. Also, since application 245 executes on the security device 160 and all data associated with the application is transmitted for display on the user device 110 in video format, whatever personal information is used or displayed by the application 245 cannot be intercepted and analyzed by a malware residing on the user device 110.

Also, in one example embodiment, the end user 100 may use the internal keyboard 230 of the security device 110 to enter authentication information, such as user names and passwords, which may be necessary to access Web resources 145 using application 245, such as e-mail application, or similar application deployed on the user device 110. In another example embodiment, the required authentication information may be stored by the Internet browser application 245 or a dedicated password management application on the security device 160. Yet in another example embodiment, the authentication information, such as digital certificates, may be obtained from an e-token, which could be connected to the device 160 through a USB port 225. In fact, in accordance with one example embodiment, one USB port 225 may be dedicated for use with e-tokens and other types of external security devices, while another USB port 225 may be used for battery charging, communication and other functions.

In one example embodiment, the authentication information may be transmitted by the security device 160 through the security server 170 to the Web server 140 in order to obtain Web resources 145. At the same time, in one example embodiment, the same authentication information may be transmitted in video format to the security agent of the user device 110 for display on the internal monitor of the user device 110. The obtained Web resources 145 are transmitted through the security server 170 to the application 245 that requested them and then forwarded by the security device 160 to the user device 110 in graphic format for display on the monitor of the user device 110. Again, since application 245 executes on the security device 160 and all data associated with the application, including authentication data and requested Web resources, is transmitted for to the user device 110 in video format, any private or confidential information used or displayed by the application 245 cannot be analyzed by a malware residing on the user device 110.

Yet in another example embodiment, in addition to browser and e-mail applications, the security device 160 may also include an antivirus application 245, such as Kaspersky® Internet Security or Kaspersky® Antivirus. The antivirus application 245 may be configured to automatically scan Web resources 145 transmitted to the user device 110 for viruses, Trojans, worms and other types of malware. Another benefit of the antivirus application 245 is that it can be automatically updated by the security server 170, which can maintain a database of latest available antivirus definitions. In one example embodiment, the antivirus application 245 may check for updates every time security device 160 connects to the security server 170. In another embodiment, the security server 170 may push the latest available antivirus definitions to the security device 160 using, e.g., Push technology.

In another example embodiment, the security device 160 may have various security features that protect it and information stored therein from external security attacks or unauthorized access. For example, the device may include a tamper detection program, which may be a component of the antivirus application 245, operable to detect any unauthorized attempts to access the RAM 210 or hard drive 215 of the security device 160. If a security attack is detected, the program may automatically erase all of the user's personal information, such as user authentication data, stored on the hard drive 215. In addition, the program may terminate all secure connections 150a and 150b with the user device 110 and security server 170. Furthermore, the security device 160 may temporary lock itself and be unlocked only upon entry of a unique authorization passcode assigned by the device manufacturer to the legal owner of the security device 160. In addition, a notification of the security attack may be send to the security server 170. Furthermore, the end user 100 of the security device 160 can notify the security server 170 in case the security device 160 was lost or stolen, and the security server will send a signal to the security device 160, which will disable the security device 160 next time it is activated.

In one example embodiment, the security device 160 may be used to dynamically configure security settings for the unsecure network environment. For example, security device 160 may automatically specify different security settings, based on, for example, the type of network 130 (e.g., whether it is private or public network, wired, wireless or cellular network, etc.). In addition, the security setting may be set based on the hardware or software configuration of user device 110 (e.g., the type of OS, presence of OS security patches, presence of security applications, such as antivirus or firewalls and other security-related configurations). If the network 130 and the user device 110 are determined to be unsafe by the security device 160, then the security device may require the end user 100 to use security device's internal Internet browser 245 instead of the browser installed on the user device 110, and require the input from the security device's secured keyboard 230 instead of the native data entry device of the user device 110. In other embodiments, the security device 160 may be configured not to activate a video channel and applications 245 if user wants to user security device 160 only as a secure connection carrier from the user device 110 to the security server 170. Yet in another example embodiment, the security settings may be dynamically changed based on changes in the network environment in which the user device operates (e.g., transition from public to private network) as well as changes to the user device 110 itself (e.g., detection of a malware on the user device).

Generally, in various example embodiments, the security device 160 may provide the following security features: Establishment of secured connections, e.g., VPN, WAP, WAP2, WEP2 and HTTPS, over unsecure public wired, wireless or cellular network 130. Password management capabilities—storing passwords on the security device 160 does not require storage of password on unsecure user device 110. Running Internet applications on security device 160 and passing only video output to the user device 110. Enhancing security of user authentication data by using security device 160 with integrated data input device, such as a keyboard, for entry of passwords and other user authentication data not through the unsecure user device 110, but through the secure security device 160.

In the above-described manner, the security device 160 provides comprehensive network and data security in the unsecure network environment 130. In particular, data transmissions over unsecure network 130 cannot be analyzed by a network sniffer or packet analyzer because data transmitted to and from the user device 110 is encrypted and transmitted through secure connections 150a and 150b; user's personal authentication data, such as login names and passwords, cannot be stolen because it is stored by secure applications 245, which are safely run by the hardened OS 240 on the security device 160; and, finally, user's data input cannot be intercepted or analyzed by a keylogger or other malware because the data is inputted through the secured keyboard 230 of the security device 160. There are other benefits of the security device of the present invention as will be evident from the following description of methods of operation of the security device.

Figure 3:
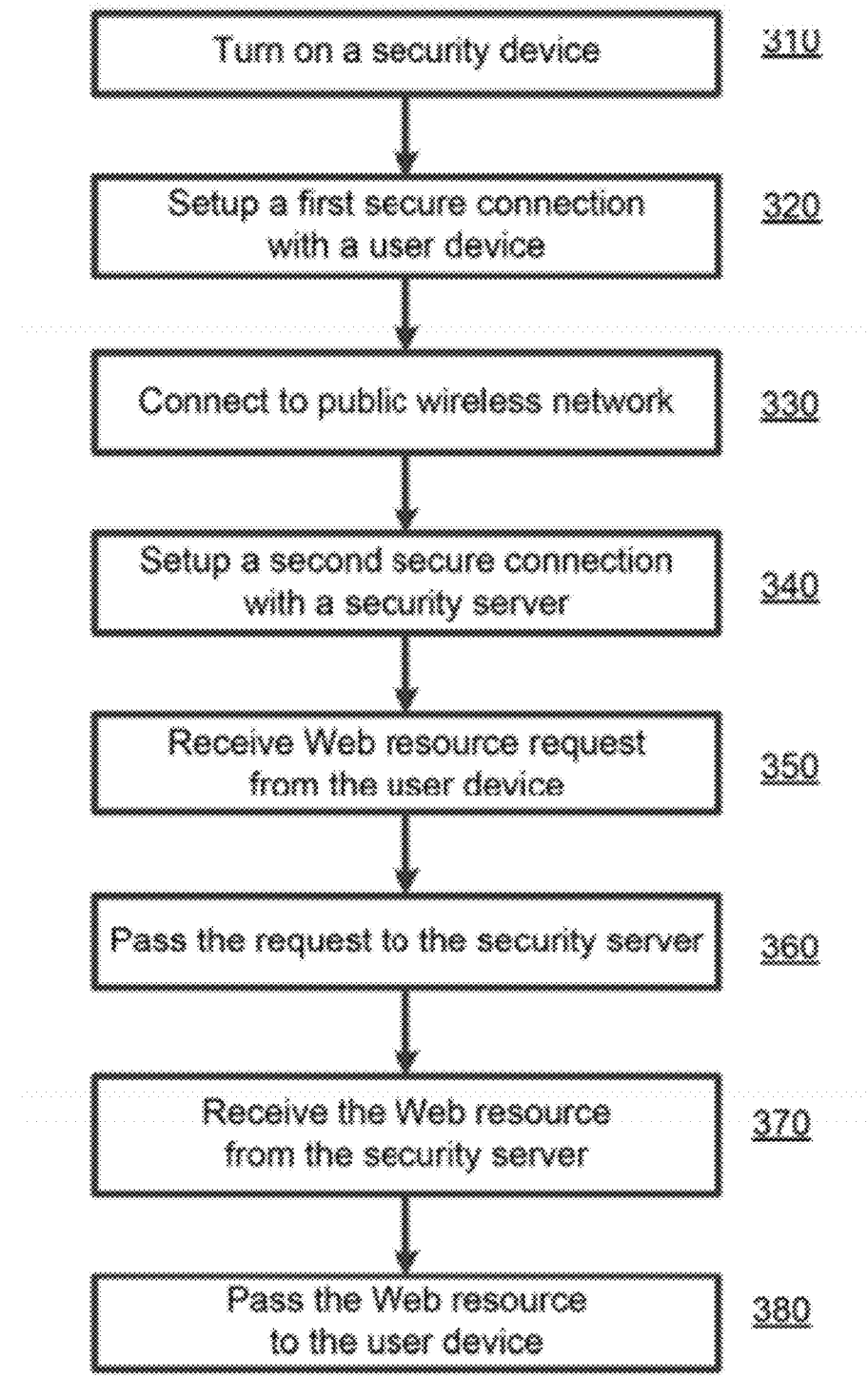
FIG. 3 illustrates a flow chart of a methodology of providing secure Internet access by the security device in unsecure network environment according to one example embodiment.

FIG. 3 depicts one example embodiment of a methodology of providing secure Internet access to a user device operating in an unsecure network environment using the security device of the present invention. After being activated by the end user 100, at step 310, the security device 160 establishes at step 320, a first direct secure wireless connection 150a with the user device 110 using its first wireless network module 250a. At step 330, the security device searches using second wireless network module 250b any available public wireless networks 130 and, if such network is found, connects to the network 130 using second wireless network module 250b. At step 340, the security device 160 sets up through the public network 130 a second secure connection 150b with the security server 170. The security server 170 is configured to provide Internet access to the user device 110 via security device 160. At step 350, the security device 160 receives through the first secure connection 150a from an Internet browser or e-mail application of the user device 160 a request for a Web resource 145. At step 360, the security device 160 passes the request through the second secure connection 150b to the security server 170. The security server 170 is operable to request Web resource 145 from Web server 140 through connection 155. The security server 170 may scan the received Web resource 145 for viruses before passing it to the security device 160. After receiving the requested Web resource 145 from the security server 170 at step 370, the security device 160 passes the requested Web resource 145 to the user device 110 at step 380. In this manner, the security device 160 provides secure Internet access to the user device 110 in the unsecure network environment 130.

Figure 4:
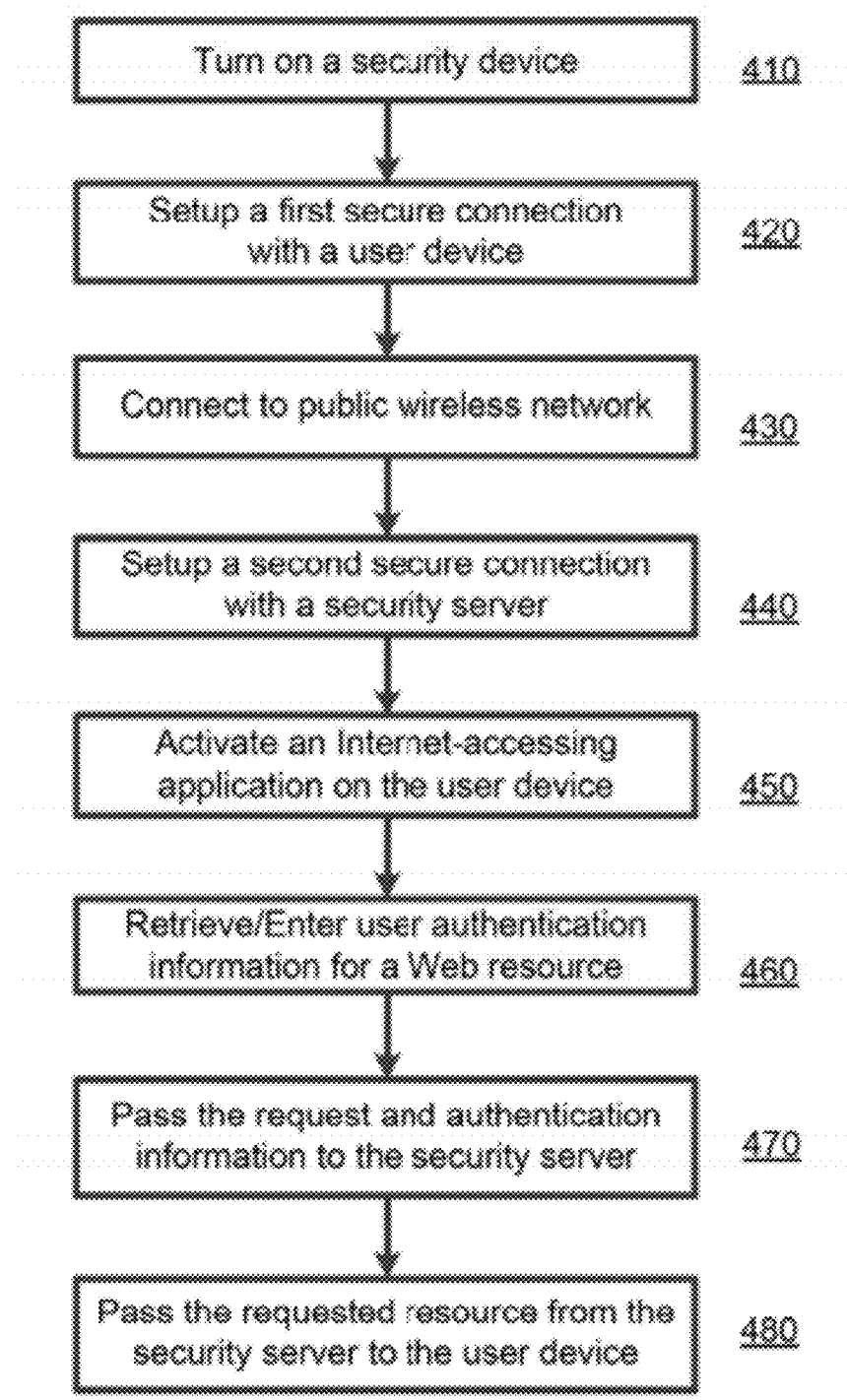
FIG. 4 illustrates a flow chart of a methodology of secure management and entry of user authentication information by the security device according to one example embodiment.

FIG. 4 depicts one example embodiment of a methodology of secure management and entry of user authentication information by the security device of the present invention. After being activated by the end user 100 at step 410, the security device 160 establishes at step 420, a first direct secure wireless connection 150a with the user device 110. At step 430, the security device searches for any available public wireless networks 130 and, if such network is found, connects to the network 130. At step 440, the security device 160 sets up through the public network 130 a second secure connection 150b with the security server 170. At step 450, the end user 100 activates an Internet browser, e-mail application or other communications application on the user device 110, which sends a Web resource request to the security device 160 through the first secure connection 150a. At step 460, the end user 110 types in using secure keyboard 230 of the security device 160 user's authentication information, such as user name and password, associated with the activated application or requested Web resource 145. Alternatively, the security device 160 activates password management application 245, which retrieves from the permanent storage 215 of the security device 160 the user authentication information associated with the activated application or requested Web resource 145. At step 470, the security device 160 passes the Web resource request along with the user authentication information through the second secure connection 150b to the security server 170. The security server 170 uses user's authentication information to obtain the requested Web resource 145 from Web server 140. After receiving the requested Web resource 145 from the security server 170, the security device 160 passes the Web resource 145 to the user device 110 at step 480.

Figure 5:
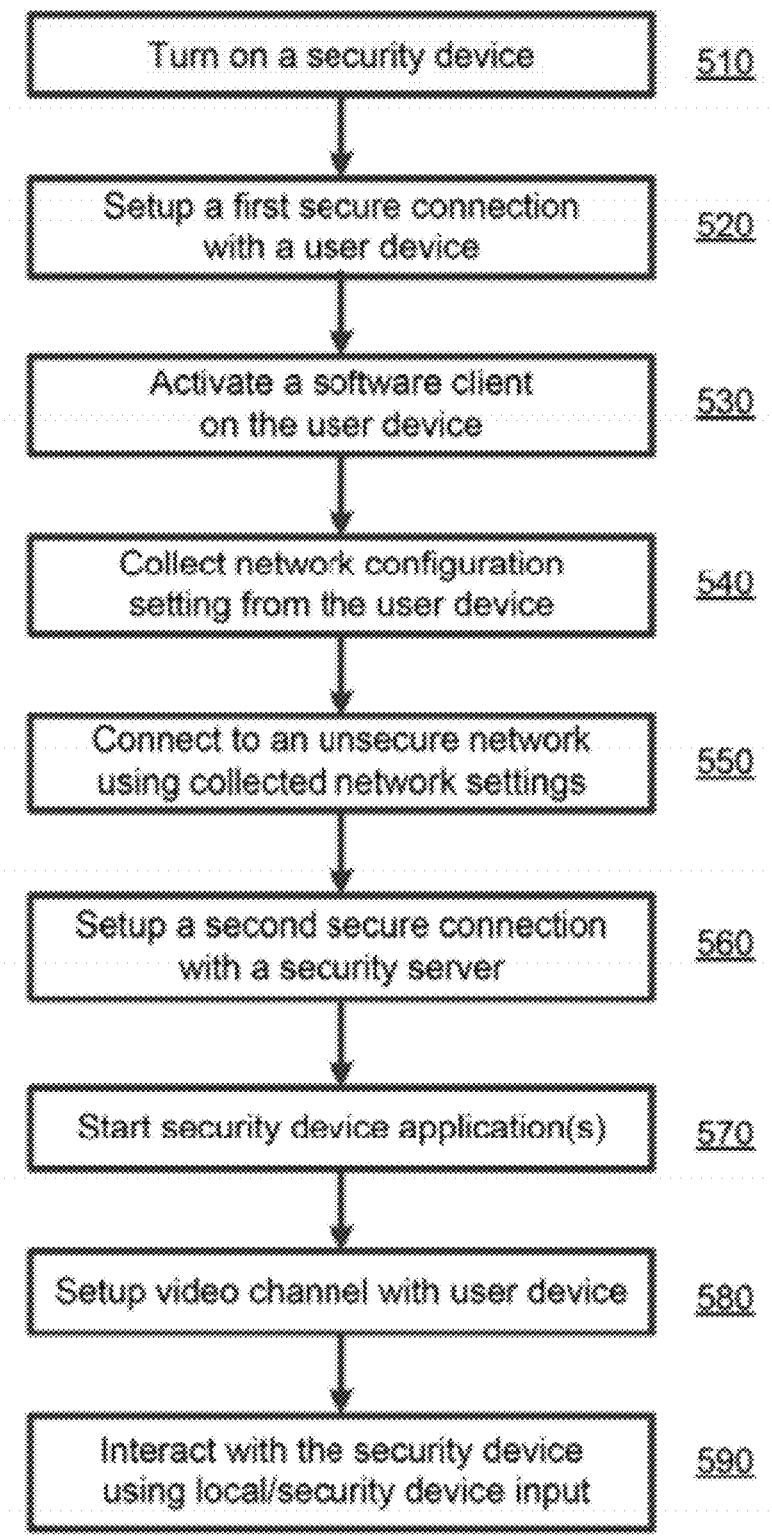
FIG. 5 illustrates a flow chart of a methodology of providing secure Internet access by the security device in unsecure network environment according to another example embodiment.

FIG. 5 depicts another example embodiment of a methodology of providing secure Internet access to a user device operating in an unsecure network environment using the security device of the present invention. After being activated by the end user 100, at step 510, the security device 160 establishes at step 520, a first direct secure wireless connection 150a with the user device 110. The connection 150a may be a direct wireless connection between one of the wireless network modules of the security device 160 and a wireless network module 250a of the user device 110. Then, in one example embodiment, the security device 160 may activate at step 530, a security agent of the user device 110 which collects at step 540, the last-used network configuration settings from user device 110. The network configuration settings may be used by the security device 160 to connect at step 550, using the same network module 250a or other wireless or cellular network module 250b to the unsecure network 130. If no previous network configuration settings are available on the user device 110, the end user 100 can setup network manually using the security agent on the user device 110, or the security device 160 may search for the available wireless or cellular networks using conventional techniques. At step 560, the security device 160 establishes a second secure connection 150b through the network 130 to the security server 170. The second secure connection 150b may be a VPN tunnel.

In one example embodiment, at step 570, the security device 160 may start an Internet browser application or another Internet-accessing application 245 installed on the security device 160. If the security device 160 has an integrated display 235, the GUI of the application 245 may be displayed on that display. If the security device 160 does not have a display, the device 160 may setup a video channel through the first secure connection 150a with the security agent on the user device 110 at step 580, and transmit the GUI of the application 245, as a video signal, such as MPEG2 or other streaming video format, over the video channel through the first secure wireless connection 150a to the security agent on the user device 110. The security agent may be configured to receive the video signal from security device 160 and reproduces it on the monitor of the of the user device 110.

In one example embodiment, at step 590, the end user 100 may use the keyboard 230 of the security device 160 to type in the browser application 245 a URL address of a Web resource 145. The entered URL address may be displayed on the internal display 235 of the security device 160, or transmitted, as a video signal, to the security agent on the user device 110 for display on the monitor of the of the user device 110. In another example embodiment, the user may use keyboard of the user device 110 to type in the desired URL address, in which case the security agent will transmit the entered data to the security device 160 through the first secure connection 150a. The security device 160 transmits request for this Web resource 145 through the second secure connection 150b to the security server 170, which access the Internet to obtain the requested Web resource 145 from Web server 140. The security device 160 may display the interface of the application 245 as well as the obtained Web resource on the internal display 235. Alternatively, the security device 160 may transmit the interface of the application 245 as well as the obtained Web resource 145, as a video signal, using the video channel over the first secure network connection 150a for display on the monitor of the user device 110.

Figure 6:
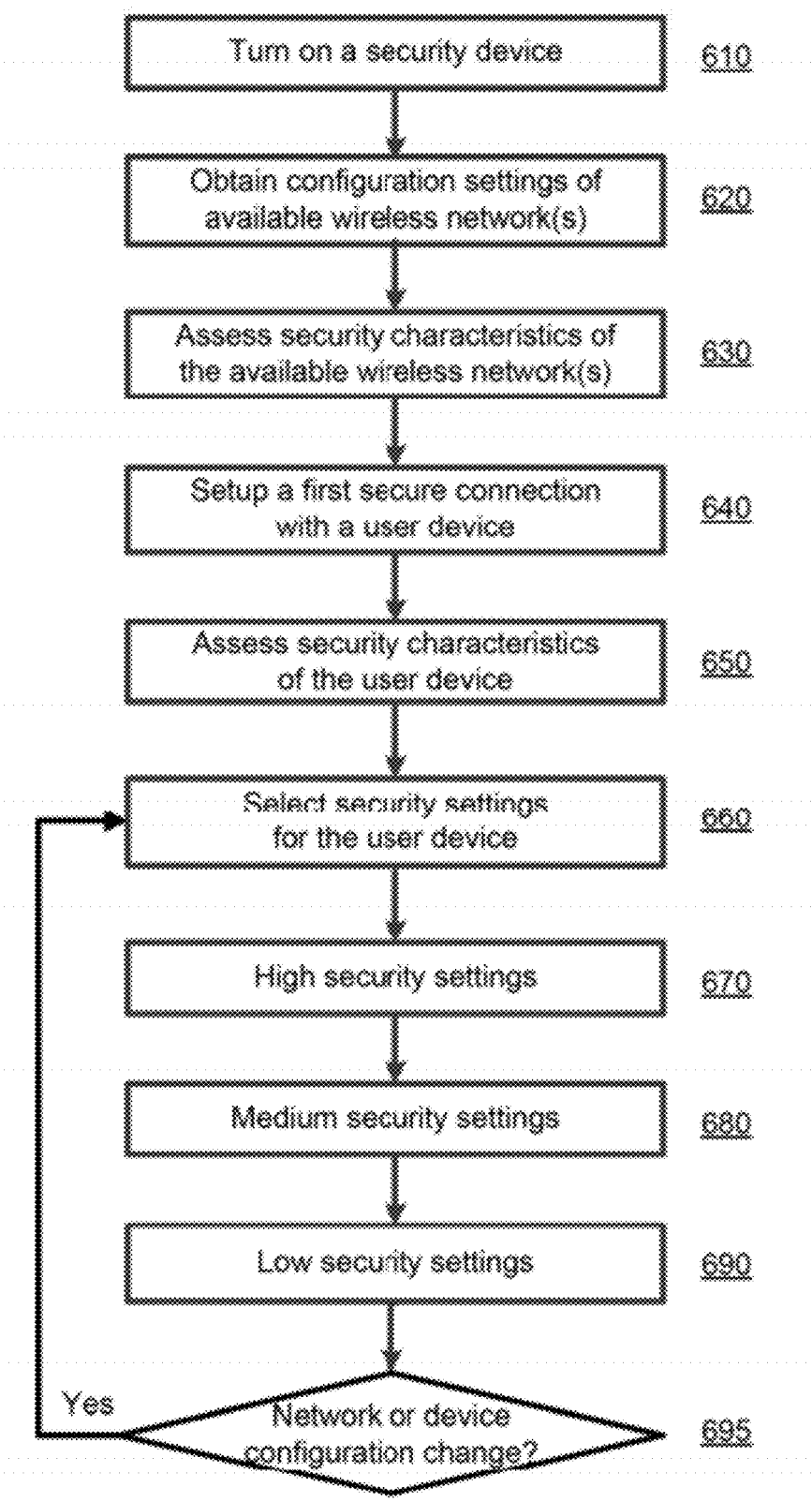
FIG. 6 illustrates a flow chart of a methodology of dynamically changing network security settings by the security device according to one example embodiment.

FIG. 6 depicts one example embodiment of a methodology of dynamically changing network security settings using security device of the present invention. After being activated, at step 610, by the end user 100 the security device 160, at step 620, searches or obtains from the user device 110 configuration settings for the available wireless network(s) 130. At step 630, the security device 160 assesses the security characteristics of the available wireless local area network(s), e.g., whether it is private or public network, whether it is wireless or cellular network, whether it uses secure network protocols, such as WEP, and other security-related characteristics. At step 640, the security device 160 establishes a first direct secure wireless connection 150a with the user device 110. At step 650, the security device 160 obtains and assesses the security characteristics of the hardware and software of the user device 160, including but not limited to the type of the OS (e.g., security-focused OS or not), presence of OS security patches, presence of security applications, e.g., antivirus application or firewall and other security-related configuration settings. This information about the user device 110 may be obtained using security agent deployed on the user device 110. At step 660, the security device 160 selects an appropriate security configuration for the user device 110 based on results of assessment of security characteristics of the network 130 and user device 110.

In one example embodiment, the security setting may include: high security, medium security, and low security settings. At step 670, the security device 160 may select high security settings for the user device 110 if both the network 130 and the user device 110 are determined to be unsafe (e.g., network 130 is unsecure, public network and user device 110 does not have a security-patched OS or antivirus application). In this case, security device 160 may establish secure connections 150a and 150b to the security server 170. The security device 160 may also activate an Internet browser or e-mail application 245 and instruct the security agent deployed on the user device 110 to deactivate the Internet browser, e-mail application or other Internet-accessing applications on the user device 110. The security device 160 may also activate its internal keyboard 230 for use with the activated browser and e-mail applications. The security device may also set up a video channel for transmission of the browser or e-mail related data, as a video signal, for display on the monitor of the user device 160. In addition, the security device may activate antivirus application 245 for scanning data traffic to and from the user device 110 for viruses. Therefore, high security settings provide the maximum possible protection against network attacks and any malware that can infect the user device 110.

At step 680, the security device 160 may select medium security settings for the user device 110 if only one of the network 130 and the user device 110 are determined to be safe (e.g., network 130 is unsecure, public network, but user device 110 have a security-patched OS and/or updated antivirus application). In this case, the security device 160 may establish secure connections 150a and 150b through the network 130 to the security server 170. The security device 160 may allow use of the Internet browser, e-mail application or other Internet-accessing applications of the user device 110 for accessing Internet through the security server 170. However, the security device 160 may require the end user 100 to use internal keyboard 230 of the security device 160 for entry of any user authentication data associated with the activated applications. The security device 160 may also set up a video channel for transmission of the user authentication and other private data to and from the user device 110. Therefore, medium security settings provide protection against network attacks and protection of personal and confidential data transmitted on the network 130 for the user device 110.

At step 690, the security device 160 may select low security settings for the user device 110 if both the network 130 and the user device 110 are determined to be safe (e.g., network 130 is secure, private network, and user device 110 have a security-patched OS and/or updated antivirus application). In this case, the security device 160 may establish secure connections 150a and 150b through the network 130 to the security server 170. The security device 160 may allow use of the Internet browser, e-mail application or other Internet-accessing applications of the user device 110 for accessing Internet through the security server 170. Also, the security device 160 may allow the end user 100 to use keyboard of the user device 110 for entry of any user authentication data associated with the activated applications. Therefore, low security settings provide protection against attacks on the network 130.

At step 695, the security device 160 may monitor any changes in the configuration of the network 130 or user device 110 and dynamically change network security settings based on changes in the network environment in which the user device operates (e.g., transition from public to private network) or any changes to the user device itself (e.g., detection of a malware on the user device or in data transmitted to and from the device). Having detected such changes, the security device 160 dynamically selects appropriate security settings at step 660.

Figure 7:
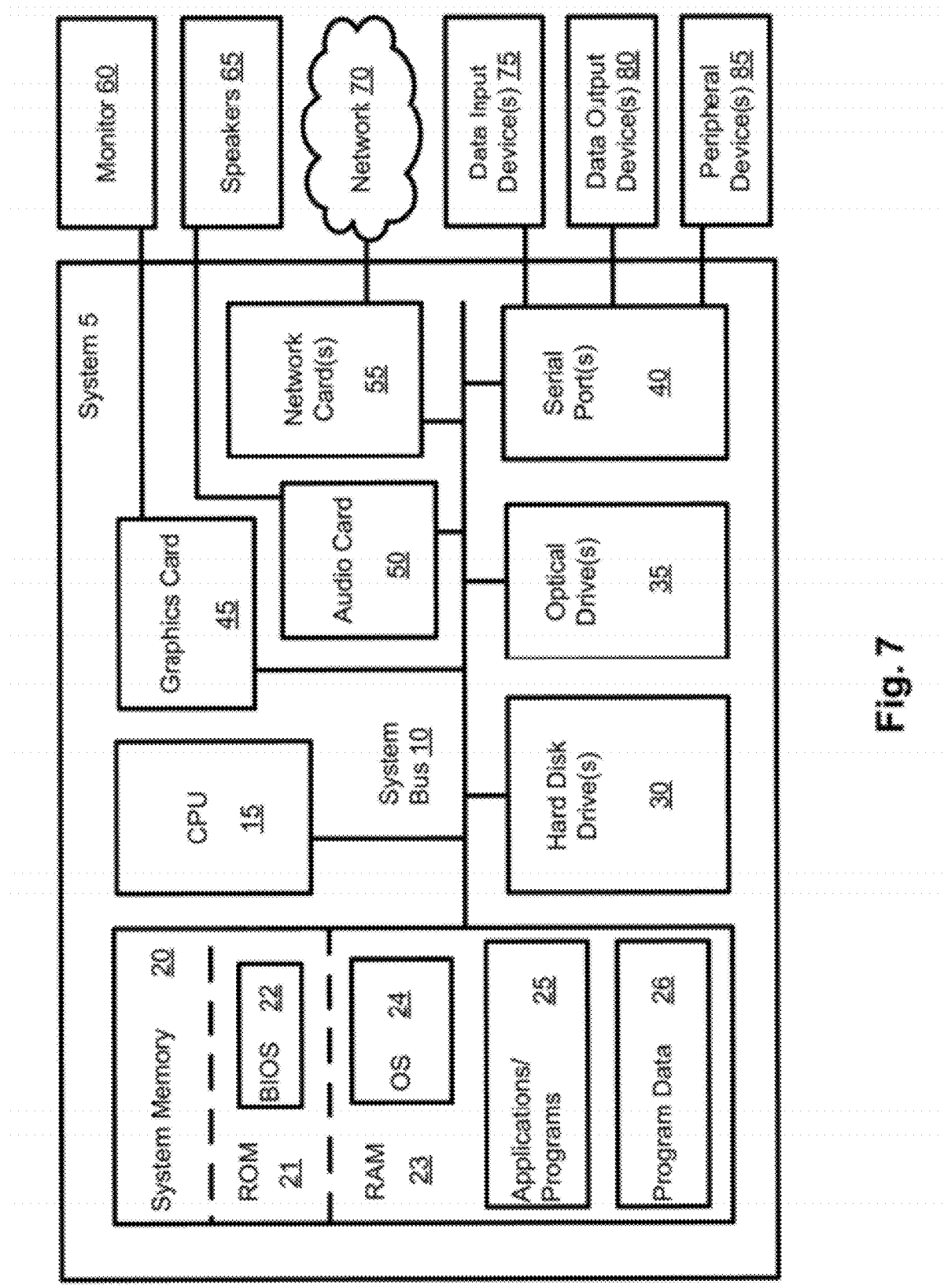
FIG. 7 illustrates a block diagram of a computer system in accordance with one example embodiment.

FIG. 7 depicts an example embodiment of a computer system 5 which can be used to implement the security device of the present invention. The system 5 may include a network server, a personal computer, a notebook, a tablet, a smart phone or other types of data processing/computing/communication devices. The system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of the system 5, such as during start-up. RAM 23 stores operating system 24 (OS), such as Windows® XP or other type of operating system, that is responsible for management and coordination of processes and allocation and sharing of hardware resources in the system 5. System memory 20 also stores applications and programs 25, such as an Internet browser application, e-mail client application, and antivirus application. Memory 20 also stores various runtime data 26 used by programs 25.

The system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary system 5 employs magnetic and optical disks, it should be appreciated by those skilled in the art that other types of computer readable media that can store data accessible by the system 5, such as magnetic cassettes, flash memory cards, digital video disks, RAMs, ROMs, EPROMs and other types of memory may also be used in alternative embodiments of the system.

The system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. The system 5 may also include graphics card 45, such as nVidia® GeForce® GT 240M or other video card, for interfacing with a monitor 60 or other video reproduction device. The system 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that other modifications than those mentioned herein possible without departing from the disclosed inventive concepts.

The invention claimed is:

1. A method for dynamically configuring network access settings for a user device via a network security device, the method comprising:
   collecting via the security device information about hardware and software of the user device;
   assessing security characteristics of the user device based on the collected hardware and software information;
   obtaining network configuration settings of a local wireless network;
   assessing security characteristics of the wireless network based on the network configuration settings;
   selecting network access settings for the user device based on the security characteristics of the user device and the security characteristics of the wireless network, wherein the network access settings are selected from at least one item in a group consisting of a set of high security settings and a set of low security settings;
   detecting changes in the security characteristics of the user device or the security characteristics of the wireless network;
   changing the network access settings for the user device based on the changes in the security characteristics of the user device or the security characteristics of the wireless network; and
   regulating via the security device the network access of the user device based on the changed network access settings of the user device.

2. The method of claim 1, wherein collecting information about hardware and software of a user device comprises:
   establishing a first secure direct wireless connection between the security device and the user device;
   activating a security agent on the user device; and
   receiving from the security agent via the first secure direct wireless connection information about hardware and software of the user device.

3. The method of claim 2 further comprising:
   establishing via the security device a second secure network connection via the wireless network with a security server, which provides Internet access to the user device.

4. The method of claim 3, wherein the network access setting for the user device are selected by the network security device from at least one item in a group consisting of a set of high security settings, a set of medium security settings and a set of low security settings.

5. The method of claim 4, further comprising:
   selecting at least one item from the set of high security settings when both the user device and the wireless network are found unsecure based on an assessment of the security characteristics of the user device and the security characteristics of the wireless network;
   selecting at least one item from the set of medium security settings when one of the user device and the wireless network is found unsecure based on the assessment of the security characteristics of the user device and the security characteristics of the wireless network; and selecting at least one item from the set of low security settings when both the user device and the wireless network are found secure based on the assessment of the security characteristics of the user device and the security characteristics of the wireless network.

6. The method of claim 5, wherein the set of high security settings comprises:
   deactivating one or more network-accessing applications on the user device;
   activating one or more network-accessing applications on the security device;
   activating a data input user interface of the security device for receiving user authentication data associated with the one or more activated network-accessing applications;
   transmitting application-related data and the user authentication data to and from the user device via the first and second secure network connections.

7. The method of claim 5, wherein the set of medium security settings comprises:
   activating one or more network-accessing applications on the user device;
   activating a data input user interface of the security device for receiving user authentication data associated with the one or more activated network-accessing applications;
   transmitting application-related data and the user authentication data to and from the user device via the first and second secure network connections.

8. The method of claim 5, wherein the set of low security settings comprises:
   activating one or more network-accessing applications on the user device;
   activating a data input user interface of the user device for receiving user authentication data associated with the one or more activated network-accessing applications; and
   transmitting application-related data and the user authentication data to and from the user device via the first and second secure network connections.

9. A network security system for dynamically configuring network access setting for a user device, the system comprising:
   a processor configured to:
   collect information about hardware and software of the user device;
   assess security characteristics of the user device based on the collected hardware and software information;
   obtain network configuration settings of a local wireless network;
   assess security characteristics of the wireless network based on the network configuration settings;
   select network access settings for the user device based on the security characteristics of the user device and the security characteristics of the wireless network, wherein the network access settings are selected from at least one item in a group consisting of a set of high security settings and a set of low security settings;
   detect changes in the security characteristics of the user device or the security characteristics of the wireless network;
   change the network access settings of the user device based on the changes in the security characteristics of the user device or the security characteristics of the wireless network; and
   regulate the network access of the user device based on the changed network access settings of the user device.

10. The system of claim 9, wherein to collect information about hardware and software of a user device, the processor further configured to:
    establish a first secure direct wireless connection with the user device;
    activate a security agent on the user device; and
    receive from the security agent via the first secure direct wireless connection information about hardware and software of the user device.

11. The system of claim 10, wherein the processor further configured to:
    establish a second secure network connection via the wireless network with a security server, which provides Internet access to the user device.

12. The system of claim 11, wherein the network access setting for the user device are selected by the network security device from at least one item in a group consisting of a set of high security settings, a set of medium security settings and a set of low security settings.

13. The system of claim 12, wherein the processor further configured to:
    select at least one item from the set of high security settings when both the user device and the wireless network are found unsecure based on an assessment of the security characteristics of the user device and the security characteristics of the wireless network;
    select at least one item from the set of medium security settings when one of the user device and the wireless network is found unsecure based on the assessment of the security characteristics of the user device and the security characteristics of the wireless network; and
    select at least one item from the set of low security settings when both the user device and the wireless network are found secure based on the assessment of the security characteristics of the user device and the security characteristics of the wireless network.

14. The system of claim 13, wherein if the processor selects the set of high security settings, the processor is configured to:
    deactivate one or more network-accessing applications on the user device;
    activate one or more network-accessing applications on the security device;
    activate a data input user interface of the security device for entering receiving user authentication data associated with the one or more activated network-accessing applications;
    transmit application-related data and the user authentication data to and from the user device via the first and second secure network connections.

15. The system of claim 13, wherein if the processor selects the set of medium security settings, the processor is configured to:
    activate one or more network-accessing applications on the user device;
    activate a data input user interface of the security device for receiving user authentication data associated with the one or more activated network-accessing applications;
    transmit application-related data and the user authentication data to and from the user device via the first and second secure network connections.

16. The system of claim 13, wherein if the processor selects the set of low security settings, the processor is configured to:
    activate one or more network-accessing applications on the user device;

activate a data input user interface of the user device for entering user receiving user authentication data associated with the one or more activated network-accessing applications; and transmit application-related data and the user authentication data to and from the user device via the first and second secure network connections.

17. A computer program product embedded in a non-transitory computer-readable storage medium, the computer-readable storage medium comprising computer-executable instructions for dynamically configuring network access setting for a user device via a network security device, the medium comprising instructions for:

collecting via the security device information about hardware and software of the user device;

assessing security characteristics of the user device based on the collected hardware and software information;

obtaining network configuration settings of a local wireless network;

assessing security characteristics of the wireless network based on the network configuration settings;

selecting network access settings for the user device based on the security characteristics of the user device and the security characteristics of the wireless network, wherein the network access setting are selected from at least one item in a group consisting of a set of high security settings and a set of low security settings;

detecting changes in the security characteristics of the user device or the security characteristics of the wireless network;

changing the network access settings for the user device based on the changes in the security characteristics of the user device or the security characteristics of the wireless network; and regulating via the security device the network access of the user device based on the changed network access settings of the user device.

18. The product of claim 17, wherein instructions for collecting information about hardware and software of a user device further comprise instructions for:

establishing a first secure direct wireless connection between the security device and the user device;

activating a security agent on the user device; and receiving from the security agent via the first secure direct wireless connection information about hardware and software of the user device.

19. The product of claim 18, further comprising instructions for:

establishing via the security device a second secure network connection via the wireless network with a security server, which provides Internet access to the user device.

20. The product of claim 19, wherein the network access setting for the user device are selected by the network security device from at least one item in a group consisting of a set of high security settings, a set of medium security settings and a set of low security settings.

21. The product of claim 20, further comprising instructions for:

selecting at least one item from the set of high security settings when both the user device and the wireless network are found unsecure based on an assessment of the security characteristics of the user device and the security characteristics of the wireless network;

selecting at least one item from the set of medium security settings when one of the user device and the wireless network is found unsecure based on the assessment of the security characteristics of the user device and the security characteristics of the wireless network; and selecting at least one item from the set of low security settings when both the user device and the wireless network are found secure based on the assessment of the security characteristics of the user device and the security characteristics of the wireless network.

22. The product of claim 21, wherein the set of high security settings comprise instructions for:

deactivating one or more network-accessing applications on the user device;

activating one or more network-accessing applications on the security device;

activating a data input user interface of the security device for receiving user authentication data associated with the one or more activated network-accessing applications;

transmitting application-related data and the user authentication data to and from the user device via the first and second secure network connections.

23. The product of claim 21, wherein the set of medium security settings comprise instructions for:

activating one or more network-accessing applications on the user device;

activating a data input user interface of the security device for receiving user authentication data associated with the one or more activated network-accessing applications;

transmitting application-related data and the user authentication data to and from the user device via the first and second secure network connections.

24. The product of claim 21, wherein the set of low security settings comprise instructions for:

activating one or more network-accessing applications on the user device;

activating a data input user interface of the user device for receiving user authentication data associated with the one or more activated network-accessing applications; and transmitting application-related data and the user authentication data to and from the user device via the first and second secure network connections.

* * * * *